US005564176A

United States Patent [19]

Garcia et al.

[11] Patent Number: 5,564,176

[45] Date of Patent: Oct. 15, 1996

[54] KIT FOR USE IN REMOVING THE HOSE PORTIONS FROM REUSABLE END COUPLINGS OF HYDRAULIC HOSE ASSEMBLIES

[75] Inventors: Harry S. Garcia, Rowlett; Lee R. Rodriguez, Balch Springs, both of Tex.

[73] Assignee: Sure Hydraulic Systems, Inc., Rowlett, Tex.

[21] Appl. No.: 309,243

[22] Filed: Sep. 20, 1994

[51] Int. Cl.[6] .......... B23P 19/04

[52] U.S. Cl. .......... 29/402.08; 29/251; 29/235; 29/426.5; 29/791; 29/244

[58] Field of Search .......... 29/252, 251, 237, 29/235, 426.4, 426.5, 402.08, 402.13, 791, 244

[56] References Cited

U.S. PATENT DOCUMENTS

| | | | |
|---|---|---|---|
| 1,356,905 | 10/1920 | Burtt | 29/251 |
| 1,408,450 | 5/1922 | Gilson | 29/251 |
| 2,628,420 | 2/1953 | Skilling | 29/252 |
| 3,283,699 | 2/1965 | Hawkins | 29/251 |
| 3,503,327 | 3/1968 | Lenz | 29/251 |
| 4,003,305 | 1/1977 | King | 29/251 |
| 4,197,795 | 4/1980 | Hawkins | 29/251 |
| 4,283,825 | 8/1981 | McKay et al. | 29/251 |
| 4,612,693 | 9/1986 | Beeler | 29/251 |
| 4,829,648 | 5/1989 | Arzenti et al. | 29/252 |
| 5,216,793 | 6/1993 | Semotiuk | 29/235 |
| 5,228,182 | 7/1993 | Hart | 29/252 |

OTHER PUBLICATIONS

Crimpmaster Catalog, Hydraulic Engineering, Inc., "Hose & Couplings", 3 pages, Feb. 1987.

Darr Equipment Co. Catalog, Caterpillar Inc., "One Safe Source", 1992, 4 pages.

*Primary Examiner*—S. Thomas Hughes
*Assistant Examiner*—Marc W. Butler
*Attorney, Agent, or Firm*—Ross, Clapp, Korn & Montgomery, LLP

[57] ABSTRACT

A kit is disclosed for use in replacing damaged hose segments of high pressure hydraulic hoses having press-fitted, straight or curved reusable end couplings. The disclosed kit includes at least one pair of support blocks; at least one mandrel having an outside diameter corresponding to the inside diameter of each hose segment to be replaced; at least one removal plate having a centrally disposed aperture corresponding to the outside diameter of each hose segment to be replaced, an elongated slot providing access to the aperture from one side of the plate, and a recess defining an annular shoulder around that portion of the aperture not communicating with the elongated slot; an adjustable pressure plate for use with hose assemblies having curved end couplings; and a U-shaped pusher bar for use with the adjustable pressure plate.

14 Claims, 4 Drawing Sheets

KIT FOR USE IN REMOVING THE HOSE PORTIONS FROM REUSABLE END COUPLINGS OF HYDRAULIC HOSE ASSEMBLIES

BACKGROUND OF THE INVENTION

1. Field of the Invention

This invention relates to high pressure hydraulic hoses, and more particularly, to a kit for use in removing and replacing the hose portion of hydraulic hose assemblies having reusable, press-fitted hose end couplings.

2. Description of Related Art

Hydraulic hose assemblies suitable for use in heavy equipment applications such as dozers, other earth-moving equipment, cranes, and the like, are often made with wire-reinforced rubber hoses having reusable, press-fitted metal end couplings. When such hoses rupture, the expense associated with the resulting downtime makes it desirable to replace the ruptured hose section as quickly as possible. Because of the variety of hose sizes, lengths, and end couplings used on such equipment, stocking made-up replacement hose assemblies for all situations is prohibitively expensive for most users.

Three primary difficulties involved in replacing the hose portion of a high pressure hydraulic hose assembly are disassembling the hose end couplings, removing the end portions of the old hose from the end couplings, and reassembling the end couplings after the hose is replaced. Methods and apparatus previously disclosed for use in removing and replacing the hose portion of hydraulic hose assemblies having reusable, press-fitted hose end couplings have now been found to be more complicated, expensive and time-consuming to use than is desirable or necessary. One such system, the CRIMPMASTER® brand marketed by Hydraulic Engineering, Inc. of Jacksonville, Fla. includes extractor plates, neck plates, extractor pins, mandrels, a push plate, a die shoe, a push tube and universal colletts. Another system, marketed by Caterpillar to its distributors, utilizes die sets for disassembling the end couplings, a strap wrench for breaking the bond between the coupling and hose inner liner, and crimp tool groups for reattaching the new hose segment to the reusable end couplings.

SUMMARY OF THE INVENTION

With the kit disclosed herein, ruptured or otherwise damaged segments of high pressure hydraulic hose can be removed and replaced much quicker and with much less expensive equipment than has previously been required using conventional means and methods. According to one embodiment of the invention, a kit is disclosed for use in replacing hose segments of high pressure hydraulic hose assemblies having press-fitted, reusable, straight or curved end couplings, the kit preferably comprising at least one pair of elongated support blocks; at least one mandrel having an outside diameter corresponding to the inside diameter of each hose segment to be replaced; at least one removal plate having a centrally disposed aperture corresponding to the outside diameter of each hose segment to be replaced, an elongated slot providing access to the aperture from one side of the plate, and a recess defining an annular shoulder around that portion of the aperture not communicating with the elongated slot; an adjustable pressure plate for use with hose assemblies having curved end couplings; and a U-shaped pusher bar for use with the adjustable pressure plate.

According to one particularly preferred embodiment of the invention, the subject kit comprises a 20-ton, manually operated, hydraulic shop press; two pairs of support blocks; five mandrels having outside diameters sized for use with the five most common inside diameters of 4-wire and 6-wire hydraulic hoses; one adjustable pressure plate; one U-shaped pusher bar; five removal plates having apertures sized for use with the most common diameters of 4-wire hydraulic hoses; and three removal plates having apertures sized for use with the most common diameters of 6-wire hydraulic hoses.

The kit of the invention can be used for removing and replacing damaged hose segments of high pressure hydraulic hose assemblies having reusable, press-fit end couplings by severing one hose end about two inches from the end coupling; inserting a mandrel into the open end of the severed end coupling; pressing the hose end out of its surrounding collar; making a longitudinal cut into the side of the hose end between two adjacent jaws of the end coupling; prying back the jaws of the end coupling; removing the hose end from the end coupling; cleaning the end coupling and collar; repeating the foregoing steps for the opposite end coupling of the hose assembly; cutting a new hose segment of a desired length; sliding each collar onto one end of the new hose segment; forcing each new hose end onto each respective end coupling; hammering the jaws of each end coupling down onto the respective hose end; and thereafter pressing the each new hose end into the respective collar.

For curved hose end couplings, the kit of the invention preferably comprises an adjustable pressure plate attachable to any curved end coupling prior to pressing the hose end into its collar.

BRIEF DESCRIPTION OF THE DRAWINGS

The apparatus of the invention is further described and explained in relation to the following figures of the drawings wherein.

DESCRIPTION OF THE PREFERRED EMBODIMENTS

Figure 1:
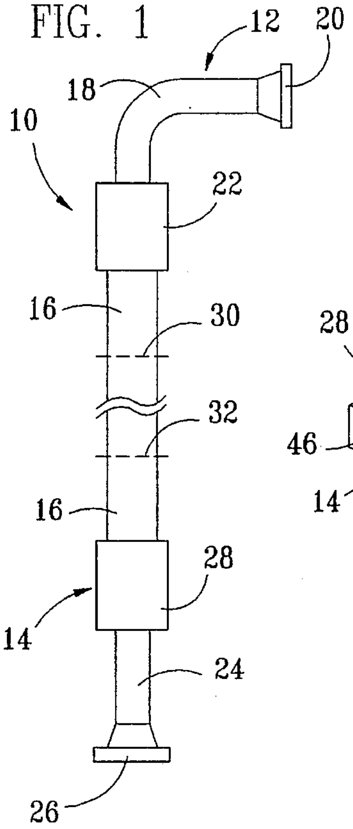
FIG. 1 is a front elevation view of a high pressure hydraulic hose assembly with reusable end couplings.

Referring to FIG. 1, high pressure hydraulic hose assembly 10 comprises curved end coupling 12 and straight end coupling 14, which are connected by hose segment 16. For high pressure hydraulic applications such as heavy equipment, hose segment 16 will typically be of either the 4-wire (#H 430 Series) or 6-wire (#H 470 Series) configuration, referring to the number of bands of spiral-wrapped wire embedded inside the rubber wall. For clarity of illustration and because the hose material itself does not constitute part of the invention, the spiral-wrapped wire bands are not shown in the drawings. The length of hose segment 16 will be dependent upon the actual nature and location of use, and one should be careful to replace ruptured or otherwise damaged hose segments with new segments of substantially the same length, especially for the heavier hoses, which are rather inflexible at ambient temperatures.

Figure 6:
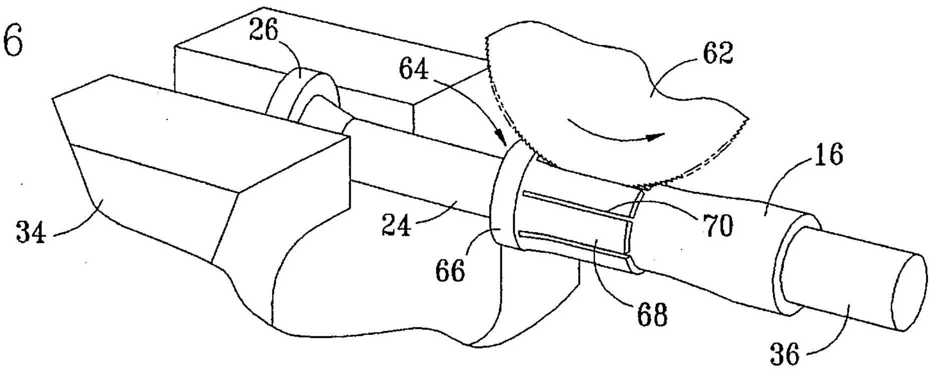
FIG. 6 is a perspective view showing a die grinder being used to cut a slit into the hose end through a slot between two jaws on the end coupling.
Figure 8:
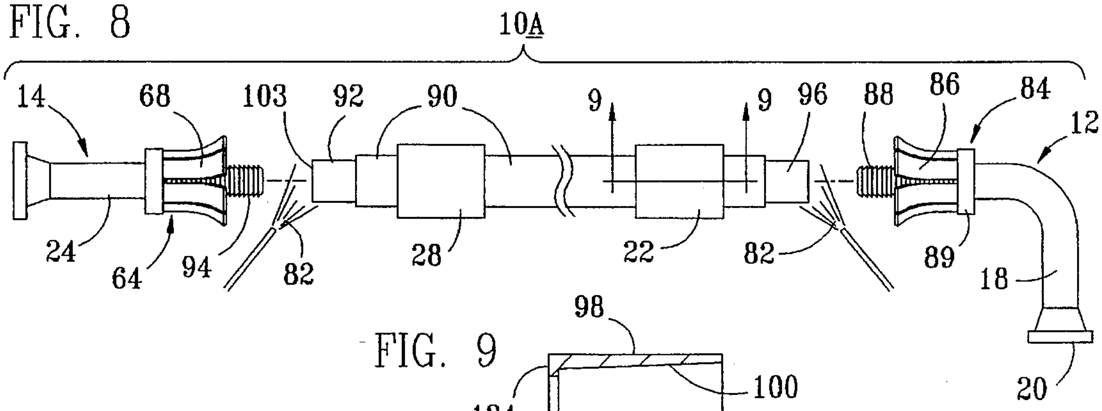
FIG. 8 is an exploded front elevation view showing two reusable end couplings just prior to reattachment to a new hose segment during reassembly of the hydraulic hose assembly.

End couplings 12, 14 as shown are exemplary of a typical hose assembly, although it is understood that the method and apparatus disclosed herein are also effective when used with hose assemblies having either straight or curved end couplings on both ends. End couplings 12, 14 are sometimes referred to as "press-fit" couplings because the ends of the hose segment are secured to the end couplings by the use of collars that can only be forced into place over the hose ends by the application of a strong force by means such as a hydraulic press. As shown in FIG. 1, end coupling 12 further comprises curved conduit section 18 having flared fitting 20 (which contains in its face an O-ring groove not visible in the drawing) at one end and collar portion 22 at the other. End coupling 14 similarly comprises straight conduit section 24 having flared fitting 20 at one end and collar portion 28 at the other. Referring to FIG. 6, where collar portion 28 has been removed, hose connector 64 comprising ring portion 66 and a plurality of circumferentially spaced jaws 68 separated by slots 70 is located under collar portion 28 of end coupling 14 of hose assembly 10 as seen in FIG. 1. Another part of end coupling 14 is conduit end portion 94, which is shown in FIG. 8 with circumferentially extending, friction-enhancing traction ribs designed to help hold the hose ends in place under jaws 68 and collar portion 28. End coupling 12 has similar structural elements disposed under collar 22, including hose connector 84 comprising ring portion 89, jaws 86 and conduit end portion 88, which are visible in FIG. 8 (where collar portion 22 is not yet reinstalled over hose connector 84 in making a new hose connection according to the method that is further described below).

One of the first steps to perform in replacing a damaged hose segment 16 between two reusable, press-fitted end couplings 12, 14 is to sever the end couplings by cutting (preferably with a power saw) through hose segment 16, desirably at a distance of about two inches from the inwardly extending ends of collar portions 22, 28 as shown by lines 30, 32, respectively. Where both of the end couplings are curved, one should note the angular orientation between them prior to making cuts 30, 32 to insure that the proper relative positional relationship is again established when end couplings 12, 14 are reattached to a new hose segment later in the method of the invention. Failure to note and reproduce the correct positional relationship may here again make it difficult or impossible to reconnect the repaired hose assembly in its original service because of the limited flexibility of the heavy duty hose. Even where only one curved end coupling is used, as for hose assembly 10, it is desirable to note the position of the single cured end coupling 12 relative to any curvature in hose 16 (although no such curvature is seen in FIG. 1) to facilitate reinstallation of the repaired hose assembly.

Figure 3:
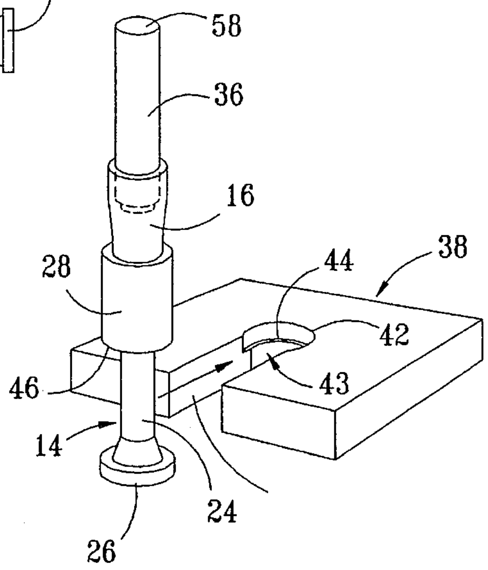
FIG. 3 is a perspective view of the combined mandrel and straight end coupling of FIG. 2 being inserted into a removal plate.
Figure 2:
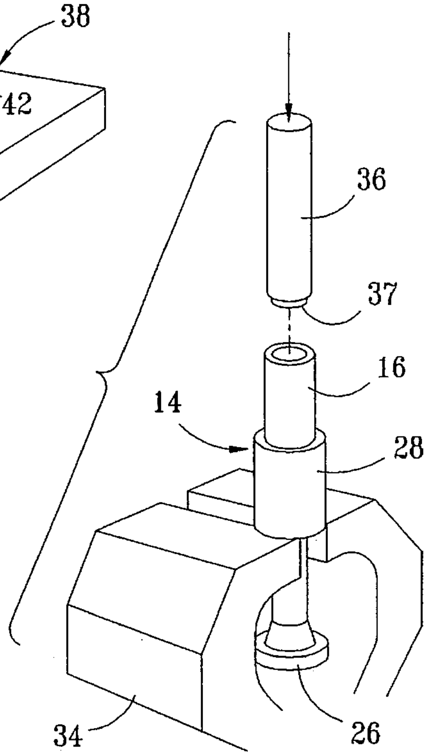
FIG. 2 is a perspective view of a mandrel being inserted into the open hose end of a straight end coupling severed from the hose assembly of FIG. 1.

Referring to FIG. 2, once end couplings 12, 14 are severed from damaged hose segment 16, end coupling 14 is desirably placed between the jaws of vise 34 with the open end of hose segment 16 facing upwardly. Mandrel 36, having substantially the same outside diameter as the inside diameter of hose segment 16, is then forced such as by hammering into the open end of hose segment 16. For clarity of illustration, FIG. 3 shows mandrel 36 only partially inserted into hose segment 16, although it should be understood that mandrel 36 is desirably driven downwardly as far as possible into hose segment 16 prior to removing end coupling 14 from vise 34 to reduce the chance of buckling when the combined mandrel/end coupling unit is subjected to load when placed in a shop press as described below. Mandrel 36 preferably comprises a reduced diameter section 37 at its bottom end to facilitate insertion of the mandrel into hose 16. The reduced diameter section 37 is preferably about 0.25 inches long and the amount of reduction in the diameter preferably ranges from about 0.15 inches for a 0.5 inch ID hose to about 0.275 inches for a 1.5 inch ID hose. The same mandrel 36 can be used for either 4-wire or 6-wire hoses having the same nominal inside diameters. According to a particularly preferred embodiment of the invention, mandrel 36 has an overall length of about 5 inches.

Referring to FIG. 3, after mandrel 36 is inserted into the open end of hose 16, end coupling 14 is desirably mated with removal plate 38 by passing conduit portion 24 through slot 40 and then lowering bottom surface 46 of collar portion 28 into abutting engagement with annular shoulder 44. Removal plate 38 preferably comprises a centrally disposed, stepped-diameter aperture 43 communicating with slot 40. The diameter of counterbore section 42 is desirably slightly greater than the outside diameter of collar 28, and the diameter of aperture 43 below annular shoulder 44 is desirably slightly greater than the outside diameter of ring portion 66 of hose connector 64. When constructed in this manner, removal plate 38 is used to seat collar 28 on annular shoulder 44 inside counterbore section 42 while hose connector 64 and mandrel 36 are pressed downwardly through and out of collar 28 as explained below in relation to FIGS. 4 and 5. For hose assemblies 10 comprising 6-wire hose segments 16, the width of slot 40 and the diameters of counterbore section 42 and that portion of aperture 43 below annular shoulder 44 are typically greater than for a 4-wire hose segment having the same nominal inside diameter. For this reason, different removal plates 38 are preferred for use with 4-wire and 6-wire hose assemblies having the same nominal inside diameter. According to a particularly preferred embodiment, satisfactory dimensions for use in making removal plates 38 suitable for use in the kit and method of the invention are shown in the following table, where A is the diameter of aperture 43 below shoulder 44, where B is the diameter of counterbore section 42, and where C is the width of elongated slot 40, all dimensions being expressed in inches.

TABLE I

| | A | B | C |
|---|---|---|---|
| 4-Wire Hose (ID in inches) | | | |
| 0.50 | 1.150 | 1.325 | 1.000 |
| 0.75 | 1.400 | 1.675 | 1.250 |
| 1.00 | 1.775 | 2.000 | 1.625 |
| 1.25 | 2.250 | 2.500 | 2.150 |
| 1.50 | 2.550 | 2.775 | 2.400 |
| 6-Wire Hose (ID in inches) | | | |
| 0.75 | 1.600 | 1.850 | 1.475 |
| 1.00 | 1.850 | 2.100 | 1,700 |
| 1.25 | 2.325 | 2.625 | 2.000 |
| 1.50 | 2.600 | 2.900 | 2.200 |

Although the overall dimensions of removal plate 38 can vary, square steel plates having a length and width of about six inches and a thickness of about 0.75 inches are preferred for use in the present invention. Removal plates 38 having lesser thicknesses such as, for example, 0.50 inches may be satisfactory for use in some applications, particularly with the 4-wire hoses, although thicknesses of about 0.75 inches or greater are preferred for reasons of safety and durability. According to a particularly preferred embodiment of the invention, annular shoulder 44 is desirably recessed about 0.25 inches below the top of counterbore section 42 for each of the service diameters disclosed herein.

Figure 4:
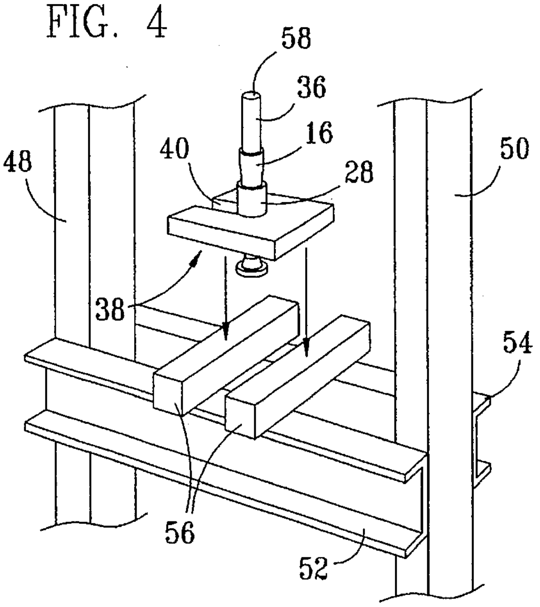
FIG. 4 is a perspective view of the straight end coupling and removal plate of FIG. 3 being placed onto support blocks in a shop press.

Referring to FIGS. 3 and 4, once end coupling 14 is seated inside removal plate 38, removal plate 38 is desirably centered across parallel steel support blocks 56 so that elongated slot 40 is transverse to the space between blocks 56 and so that flared fitting 26 extends downwardly through the space between blocks 56. Support blocks 56 are in turn supported by beams 52, 54 attached to vertical members 48, 50 of a conventional, manually controlled, hydraulic shop press having a movable head piece (not shown) with a downwardly directed ram 60, which is visible in FIG. 5. A particularly preferred shop press for use in the kit and method of the invention is a SUNEX® Model No. SI-20 shop press having a rated capacity of 20 tons. Particularly preferred dimensions for support blocks 56 are 2"×2"×11", although support blocks 56 having dimensions of 2"×1"×11" have also been satisfactorily used, and it is understood that support blocks having other dimensions can also be used within the scope of the invention provided that they are sufficiently large to provide stable support to removal plate 38.

Figure 5:
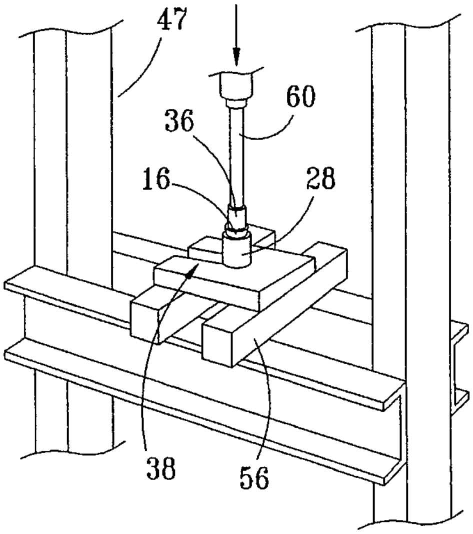
FIG. 5 is a perspective view of the shop press being used to force the hose end out of the surrounding collar portion of the hose assembly.

Referring to FIGS. 3 and 5, removal plate 38 is desirably centered on the shop press so that top surface 58 of mandrel 36 is vertically aligned under downwardly extending ram 60 of shop press 47, and support blocks 56 are desirably snugged inwardly against the sides of conduit section 24. Although not shown in FIG. 5, it will be appreciated that additional spacer plates may either be necessary or desirable for use between ram 60 and top surface 58 of mandrel 58 depending upon the clearance and range of travel of the headpiece and ram of the shop press. Once ram 60 is brought into aligned and abutting contact with top surface 58 of mandrel 36, ram 60 is hydraulically actuated to force the upwardly facing end of hose 16 downwardly through collar 28; thereby separating collar 28 from the other portions of end coupling 14.

Figure 6A:
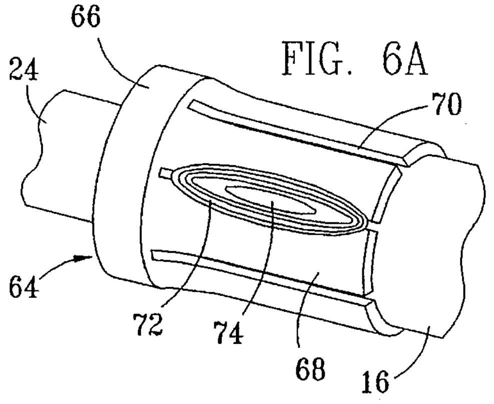
FIG. 6A is an enlarged detail view showing the slit cut into the hose end of FIG. 6.

Referring to FIGS. 6 and 6A, after the removal of collar 28, the other portions of end coupling 14 (with mandrel 36 still attached) are desirably secured horizontally in vise 34, and a device such as die grinder 62 is used to cut a longitudinally extending slit 72 in hose segment 16 along a slot 70 between two adjacent expandable jaws 68. Slit 72 preferably extends downwardly through the spiral-wrapped wire bands inside hose 16 to the underlying rubber tube 74 that forms the inside wall of hose 16. In cutting slit 72, one should desirably avoid cutting into the barbs of the hose end. As seen in FIG. 6A, die grinder 62 may also cut slightly into the side edges of jaws 68 on each side of slot 70, but this will not significantly weaken the connection to the replaced hose segment. About seven elongated jaws 68 are normally present on a typical hose connector 64, and hose connections having acceptable strength can be made even where one or two of jaws 68 are missing, although this is not recommended. Each jaw has one end attached to ring 66 and a radially expandable free end extending outwardly over the underlying conduit end portion 94 (visible in FIG. 8) and the end of hose 16.

Figure 7:
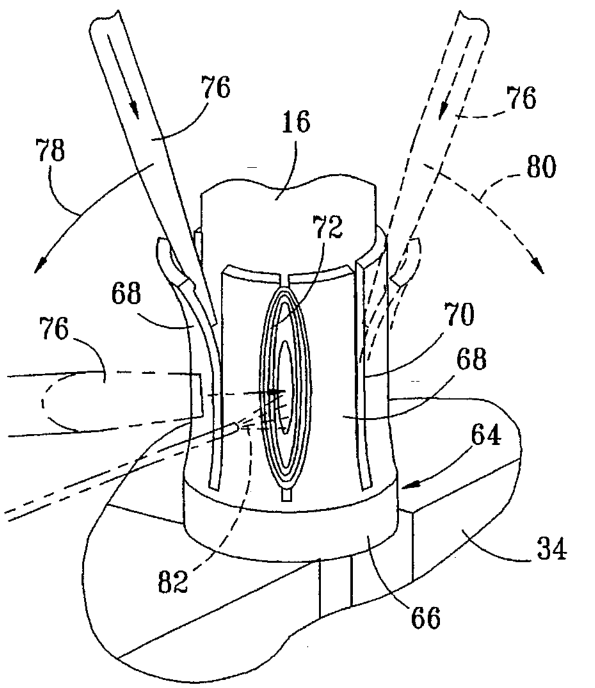
FIG. 7 is a perspective view showing the jaws of the end coupling being spread to facilitate removal of the hose end.

Referring to FIGS. 6 and 7, after slit 72 has been made in hose 16, conduit portion 24 is desirably repositioned in vise 34 so that the expandable ends of jaws 68 are upwardly facing, and tool 76 such as a slot-head screwdriver or chisel is forced downwardly between the free end of each jaw 68 and underlying hose 16 so that jaws 68 can be pried outwardly to an angle of about, for example, 45° from the vertical. A spray 82 of penetrating oil is then preferably directed into slit 72, and tool 76 is used to pry the end of hose 16 away from underlying conduit end portion 94 (FIG. 8). At some point during this procedure, mandrel 36 will be removable from hose 16, and the hose end should be saved for use in determining the correct length for the replacement hose.

After the end of hose 16 has been removed from end coupling 14 as described above, the same procedure is desirably repeated in order to remove the opposite end of hose 16 from end coupling 12. End couplings 12, 14, including collars 22, 28, respectively, are then preferably cleaned with a solvent such as those used in conventional automotive parts washers to remove any remaining adhered particles of robber or grime.

Figure 9:
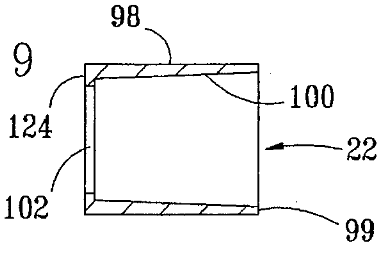
FIG. 9 is an enlarged, cross-sectional detail view of a collar portion of the curved end coupling of the hydraulic hose assembly of FIG. 8.

Referring to FIG. 8, a new replacement hose segment 90 having an overall length equal to the combined length of hose 16, including the two severed portions removed from end couplings 14, 12, respectively, is obtained. This is preferably done by measuring and cutting the desired length of hose from a roll of hose stock having the same diameter and construction as that of hose 16. Once replacement hose segment 90 is cut, it is desirably placed horizontally in a vise (not shown) with about six inches of hose protruding from the vise and the protruding end is preferably skived to produce a reduced diameter section such as sections 92, 96 shown in FIG. 8. The length of the skived portion is desirably about the same as the length of jaws 68, 86. Assuming that skived end 96 is protruding from the vise, collar 22 is then slipped over hose end 96 with small diameter end 102 facing away from hose end 96. (Referring to FIG. 9, it is seen that collar portion 22 has a tapering inside wall that is adapted to slide over jaws 86 as collar 22 is pressed back into place as described below in relation to FIG. 11.) Hose end 96 is then preferably lubricated with a spray 82 of penetrating oil and end coupling 12 is pushed against hose end 96 so that: conduit end portion 88 extends inside hose end 96 and so that hose end 96 extends under jaws 86 so as to abut against ring portion 89 of hose connector 84. For large diameter hoses, it may be preferable to secure curved conduit 18 of end coupling 12 in the vise and thereafter push hose end 96 into place over conduit end portion 88. Jaws 86 are then desirably hammered down onto hose end 96 and the same procedure is repeated for end coupling 14 and hose end 92. Where curved end couplings such as end coupling 12 are used on both ends of a hose, it is important that they be attached to the replacement hose segment in the same positional relationship that they occupied on the original hose, both with respect to each other and to any curvature that may be present in the hose itself.

Figure 10:
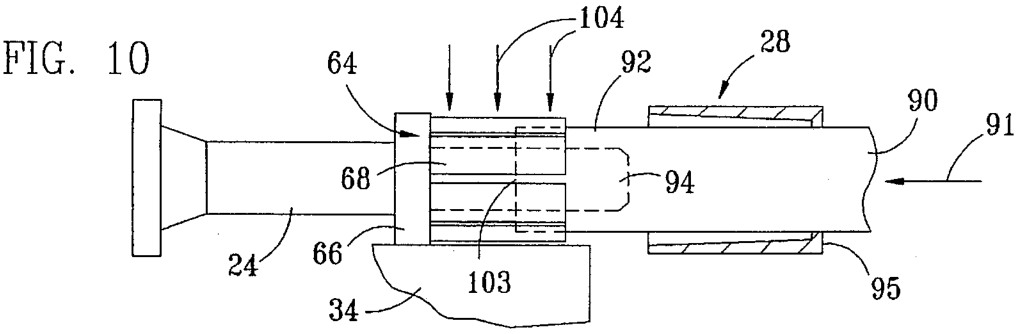
FIG. 10 is a front elevation view, partially in section, showing how the skived end of a new hose segment is pressed into the straight end coupling and the jaws of the end coupling are hammered down onto the hose end.

Referring to FIG. 10, arrow 91 shows how skived hose end 92 is inserted over conduit end portion 94 and under jaws 68 until leading edge 103 of hose end 92 abuts against ring portion 66 of hose connector 64. Arrows 104 show how force is then applied (such as by hammering) against jaws 68 to press them back against and partially into the surface of hose end 92. Although not shown in FIG. 10, it is understood that hose connector 64 is rotated as necessary on top of a support surface such as vise 34 in order to hammer jaws 68 into contact with hose end 92.

Figure 11:
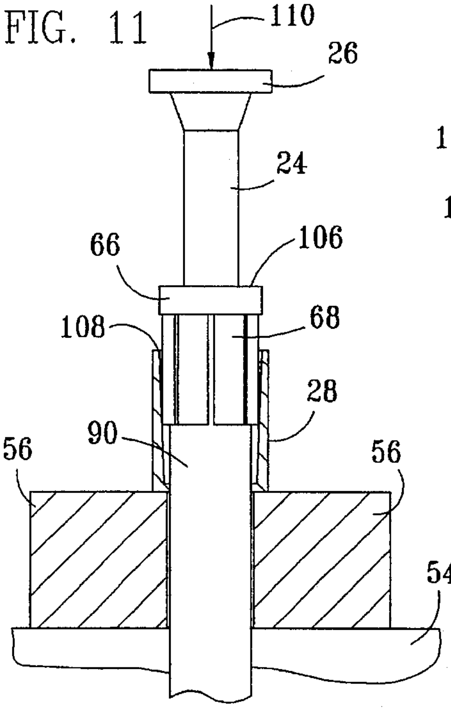
FIG. 11 is a front elevation view, partially in section, showing the hose end being pressed into the collar portion of a straight end coupling.
Figure 12:
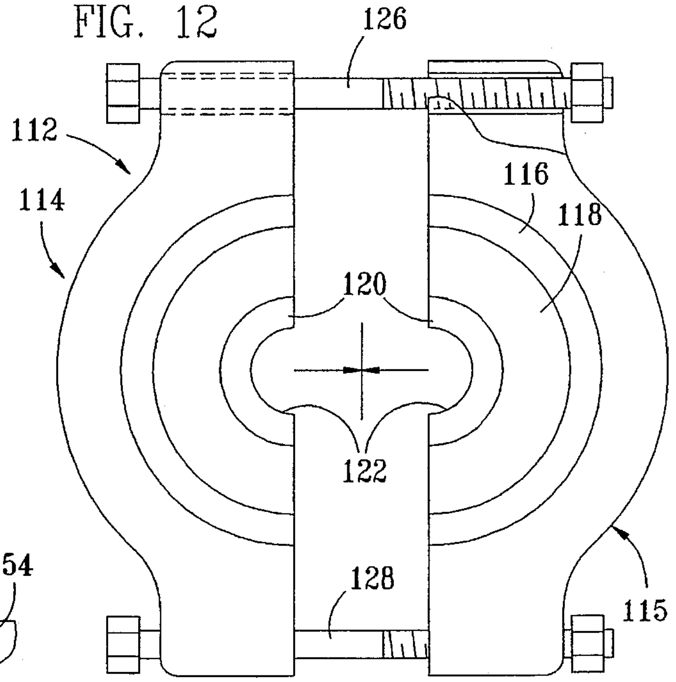
FIG. 12 is a plan view of an adjustable pressure plate.
Figure 13:
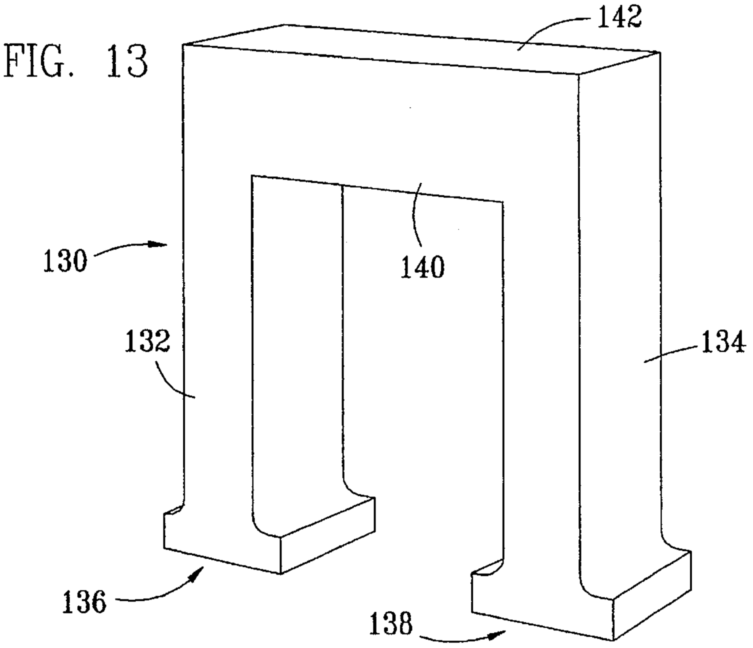
FIG. 13 is a perspective view of a U-shaped pusher bar.
Figure 14:
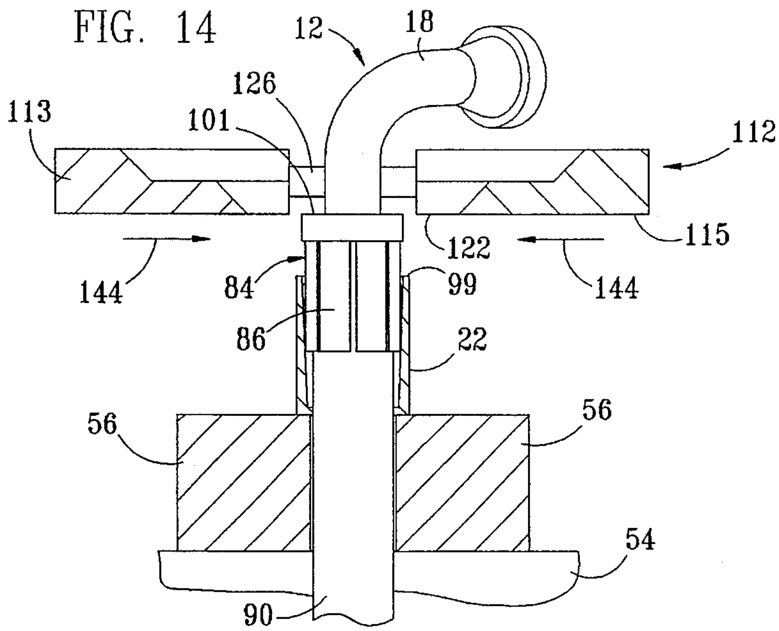
FIG. 14 is a front elevation view, partially in section, showing an adjustable pressure plate being attached to a curved end coupling prior to pressing the hose end into the collar portion of the coupling.
Figure 15:
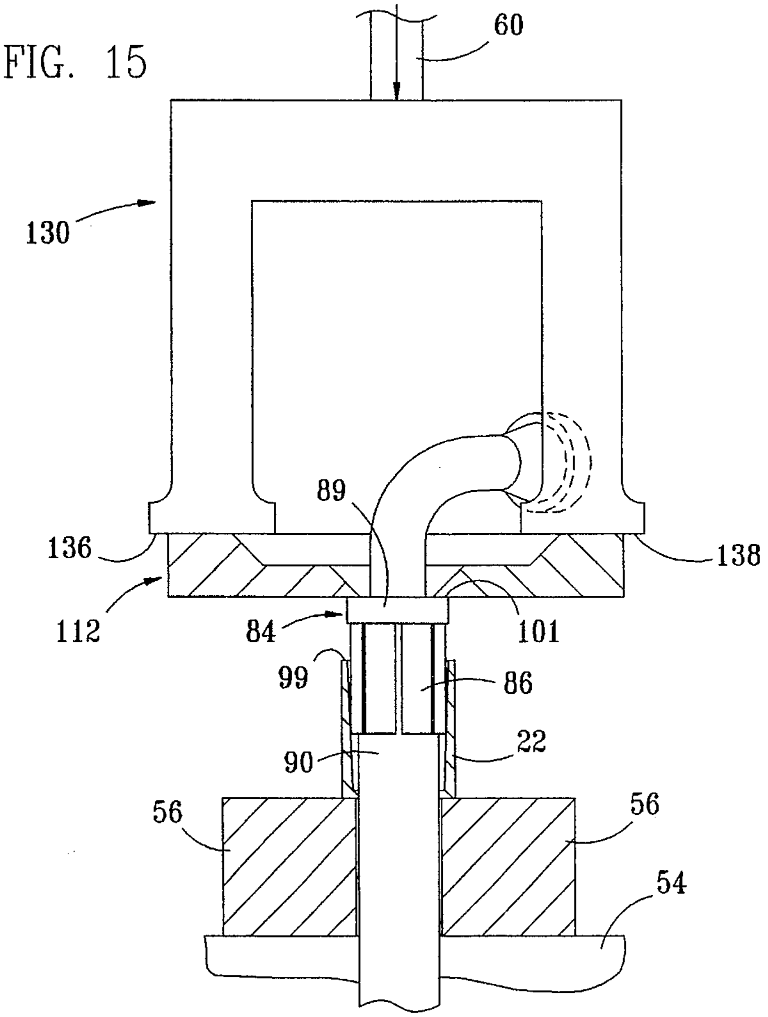
FIG. 15 is a front elevation view, partially in section, showing a. U-shaped pusher bar and adjustable pressure plate being used to press the hose end into the collar portion of a curved end coupling. Like reference numerals are used to indicate like parts in all figures of the drawings.

Referring to FIG. 11, hose 90 is next placed between support blocks 56 of shop press 47 (FIG. 5) with support blocks being positioned snugly against hose 90 under collar 28, and jaws 68 and ring portion 66 are pressed by the hydraulic force generated by the shop press headpiece (not shown) as indicated by arrow 110 down into collar 28 until surface 106 of ring portion 66 is flush with surface 108 of collar portion 28. Where the end coupling is straight, as shown in FIG. 11, it will be appreciated that hydraulic ram 60 of shop press 47 (FIG. 5) can be pressed directly against the end having flared fitting 26, using an intermediate spacer plate or plates where appropriate because of the relative diameters or spacing. Referring to FIGS. 12–15, where the end coupling is curved, however, such as with end coupling 12, the application of downward force 110 required to press hose end 96 and hose connector 84 back into collar 22 requires the use of adjustable pressure plate 112 having opposed halves 114, 115 interconnected by threaded adjustment bolts 126, 128. Halves 114, 115 of adjustable pressure plate 112 are preferably provided with a series of concentric depressions 116, 118, 120 that allow facing inside curved edges 122 to be adjusted radially inward toward curved conduit portion 18 of end coupling 12, as shown by arrows 144 in FIG. 14, to the position shown in FIG. 15, while providing clearance for the curved, upwardly extending portion of end coupling 12. Steel pusher bar 130, preferably U-shaped and best seen in FIG. 13, desirably comprises vertical members 132, 134 interconnected by cross-member 140. Downwardly facing surfaces 136, 138 of pusher bar 130 are preferably adapted to engage adjustable pressure plate 112 while a downwardly directed hydraulic force is applied against upwardly facing surface 142 as shown by arrows 60 in FIG. 15. The force exerted on pusher bar 130 is applied downwardly against adjustable pressure plate 112, and then downwardly against upwardly facing surface 101 of hose connector 84 until jaws 86 and ring portion 89 of hose connector 84 are disposed inside collar 22 and surface 101 of hose connector 84 is flush with surface 99 of collar 22.

According to the present invention, a kit for use in replacing hose segments of high pressure hydraulic hose assemblies 10 having predetermined inside and outside hose diameters and press-fitted, reusable, straight or curved end couplings 14, 12, is provided that preferably comprises at least one pair of elongated support blocks 56; at least one mandrel 36 having an outside diameter corresponding to the inside diameter of each hose segment 16 to be replaced; at least one removal plate 38 having a centrally disposed aperture 43 corresponding to the outside diameter of each hose segment 16 to be replaced, an elongated slot 40 providing access to the aperture 43 from one side of the removal plate 38, and a recessed counterbore 42 defining an upwardly facing annular shoulder 44 around that portion of the aperture 43 not communicating with the elongated slot 40; an adjustable pressure plate 112 for use with hose assemblies 10 having curved end couplings 12; and a U-shaped pusher bar 130 for use with the adjustable pressure plate 112. Optionally, the kit of the invention can further comprise a shop press 47, preferably a manually operated, hydraulic shop press having a rated capacity of about 20 tons; two differently sized pairs of elongated support blocks 56; a plurality of mandrels 36 having outside diameters selected from the group consisting of 0.5 inches, 0.75 inches, 1.00 inches, 1.25 inches, 1.50 inches and 2.00 inches; a plurality of removal plates 38 for use with 4-wire hoses wherein the apertures 43 have inside diameters selected from the group consisting of about 1.15 inches, 1.4 inches, 1.775 inches, 2.25 inches and 2.55 inches and wherein the annular shoulder 44 has a width ranging from about 0.175 inches to about 0.275 inches; and a plurality of removal plates 38 for use with 6-wire hoses wherein the apertures 43 have inside diameters selected from the group consisting of about 1.6 inches, 1.85 inches, 2.325 inches and 2.6 inches and wherein the annular shoulder 44 has a width ranging from about 0.25 inches to about 0.3 inches.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

We claim:

1. A kit for use in removing hose end portions from reusable, press-fitted end couplings of high pressure, hydraulic hose assemblies where each hose end portion has a predetermined inside and outside diameter, the kit comprising:

at least one pair of elongated support blocks;

at least one mandrel having an outside diameter corresponding to the inside diameter of each hose end portion to be removed;

at least one removal plate having a centrally disposed, stepped-diameter aperture corresponding to the outside diameter of each hose end portion to be removed, and an elongated slot providing access to the aperture;

an adjustable pressure plate for use with hose assemblies having curved end couplings; and a U-shaped pusher bar for use with the adjustable pressure plate.

2. The kit of claim 1, further comprising a manually operated, hydraulic shop press.

3. The kit of claim 2 wherein the shop press has a rated capacity of about 20 tons.

4. The kit of claim 1 wherein said at least one pair of elongated support blocks comprises two differently sized pairs of elongated support blocks.

5. The kit of claim 1 wherein said at least one mandrel comprises six mandrels, each mandrel having a different outside diameter measuring about 0.5 inches, 0.75 inches, 1.00 inch, 1.25 inches, 1.50 inches or 2.00 inches, respectively.

6. The kit of claim 1 wherein said at least one removal plate comprises five removal plates for use with hose portions having 4-wire construction, each removal plate having an aperture with a different inside diameter measuring about 1.15 inches, 1.4 inches, 1.775 inches, 2.25 inches or 2.55 inches, respectively.

7. The kit of claim 1 wherein said at least one removal plate comprises four removal plates for use with hose portions having 6-wire construction, each removal plate having an aperture with a different inside diameter measuring about 1.6 inches, 1.85 inches, 2.325 inches or 2.6 inches, respectively.

8. The kit of claim 6 wherein each removal plate has an upwardly facing annular shoulder around the aperture, said shoulder having a width ranging from about 0.175 inches to about 0.275 inches.

9. The kit of claim 7 wherein each removal plate has an upwardly facing annular shoulder around the aperture, said shoulder having a width ranging from about 0.25 inches to about 0.3 inches.

10. The kit of claim 1 wherein the at least one pair of elongated support blocks each have a cross-section of about one inch by one inch.

11. The kit of claim 1 wherein the at least one pair of elongated support blocks each have a cross-section of about two inches by two inches.

12. The kit of claim 1 wherein the elongated slot of each removal plate has a width slightly greater than the outside diameter of the hose segment to be replaced.

13. The kit of claim 1 wherein each removal plate has a maximum thickness of at least about 0.5 inches.

14. The kit of claim 13 wherein each removal plate has a maximum thickness of at least about 0.75 inches.

* * * * *